Dec. 13, 1927.

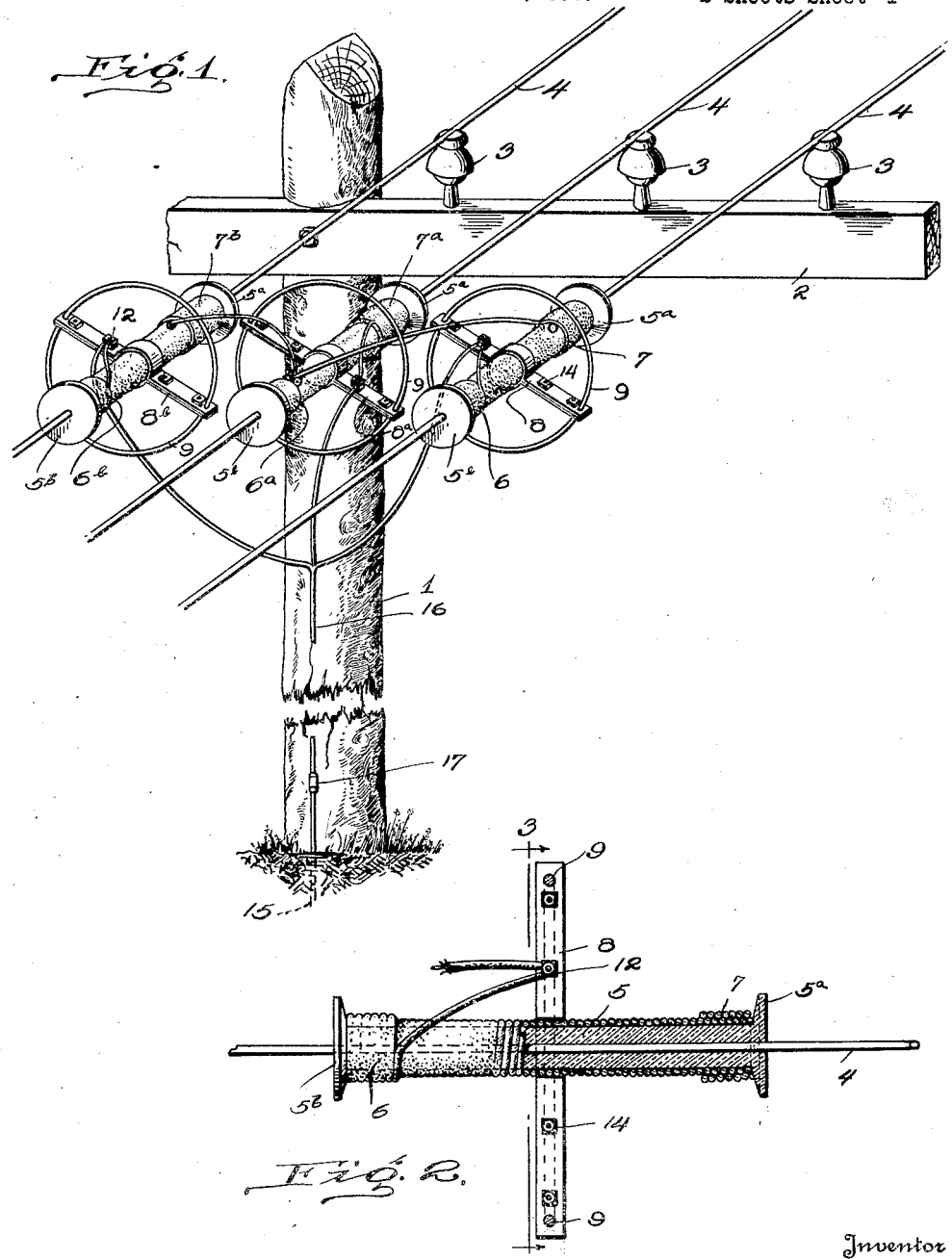

F. J. SKONIER 1,652,913

LIGHTNING ARRESTER

Filed Oct. 30, 1926

2 Sheets-Sheet 2

Patented Dec. 13, 1927.

1,652,913

UNITED STATES PATENT OFFICE.

FRANK J. SKONIER, OF ALTOONA, PENNSYLVANIA.

LIGHTNING ARRESTER.

Application filed October 30, 1926. Serial No. 145,205.

My invention relates broadly to lightning arresters, and more particularly to protective apparatus for power lines and equipment connected thereto.

One of the objects of my invention is to provide an inexpensive construction of protective apparatus for installation on power lines which will effectively prevent the sudden building up of high potentials in the line due to atmospheric conditions.

Another object of my invention is to provide a simplified construction of lightning arrester for power lines wherein the line wire is surrounded by the arrester and an electrostatic coupling provided with the line and ground for continuously draining the line of accumulated charges.

Still another object of my invention is to provide a construction of discharger for power lines in which both the line and the atmosphere in the immediate vicinity of the line are continuously drained of electrostatic charges for the prevention of destructive effects of heavy surges in the line.

A still further object of my invention is to provide a construction of lightning arrester apparatus particularly adapted for installation on polyphase line systems.

Figure 4:
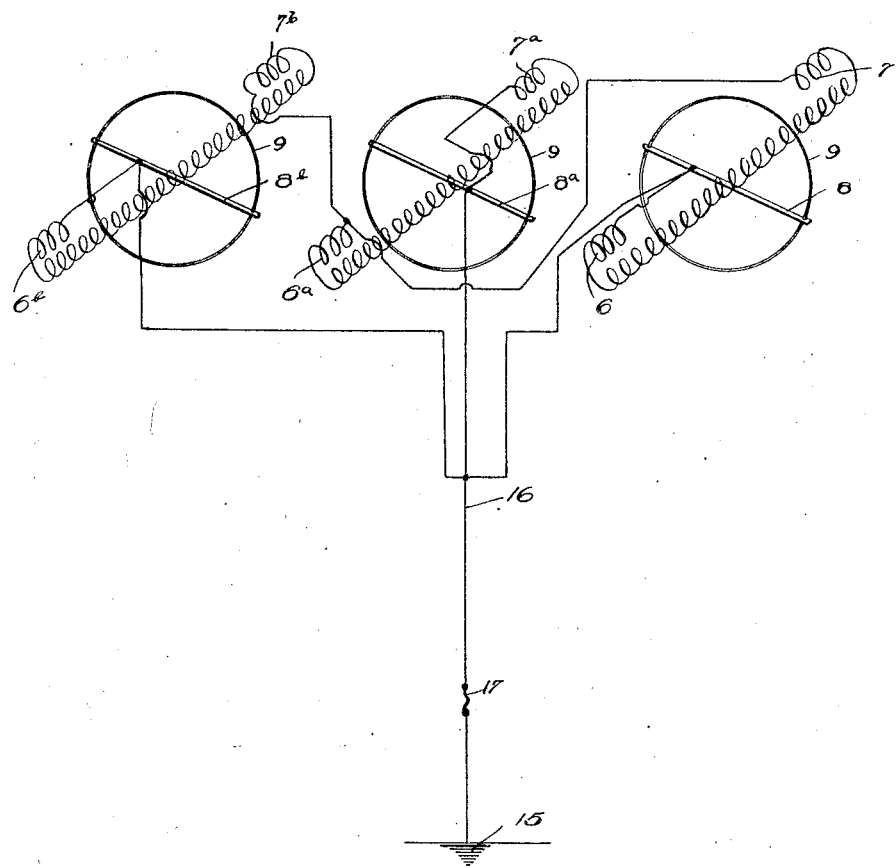
Figure 3:
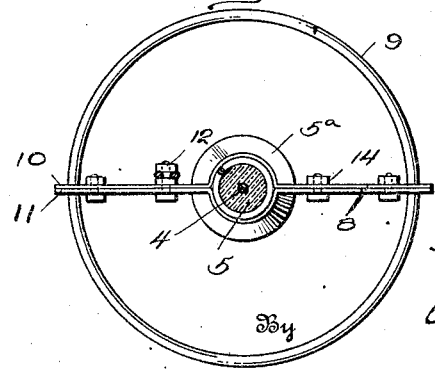

My invention will be more fully understood from the following specification by reference to the accompanying drawings, wherein:

Figure 1 is a perspective view of the protective apparatus of my invention installed on a power line system; Fig. 2 is a cross-sectional view through one of the lightning arresters of my invention; Fig. 3 is a sectional view of the apparatus taken on line 3—3 of Figure 2; and Fig. 4 is a diagrammatic view ilustrating the wiring of the protective devices with respect to the power line.

Referring to the drawings in more detail, reference character 1 designates a pole having cross arm 2 on which the insulators 3 are carried for supporting polyphase power line conductors 4. Each wire or conductor 4 is provided with a protective device consisting of an insulated spool member 5 having an axial bore therethrough for the passage of conductor 4. Each spool is provided with end flanges 5ª and 5ᵇ and between the ends of the spool, I provide windings the top layer of which terminates at 6 and 7 having the adjacent ends connected as shown diagrammatically in Fig. 4.

Around each of the insulated spools which carry the windings and at the center thereof, I provide an iron clamp consisting of members 10 and 11 secured together by means of bolts 12 and 14. The iron members 10 and 11 are in the form of flat magnetic strips which closely conform with the contour of the insulated spool 5 forming lateral extensions on opposite sides thereof. The ends of the members 10 and 11 are apertured to support a conductive loop 9, preferably of copper, which encloses the conductor 4 and the coils 6 and 7. The magnetic members provide confined paths for lines of force extending between the line system and the area immediately surrounding the line system for increasing the rate of dissipation of the accumulating charges.

In the drawings I have illustrated my invention as applied to a polyphase power line system and here the protective devices on each of the conductors 4 are Z connected. That is to say, designating the ends of the windings on the central spool member as 6ª and 7ª and those on the extreme left spool as 6ᵇ and 7ᵇ, the windings 7ᵇ, 6ª and 7 have their inner ends connected in common as shown in Fig. 4; while windings 6ᵇ, 7ª and 6 have their inner ends connected to the laterally positioned magnetic members 8, 8ª and 8ᵇ and to ground 15 through conductor 16. I may interpose a fuse 17 in the leads 16 to ground. I have illustrated the Z connection for a three wire power distribution circuit but it will be understood that in instances where the protective device is applied to a single wire system, the ends of the coil or winding may be connected across the laterally extending magnetic members and the magnetic members grounded.

The particular embodiment of my invention illustrated in the drawings has been found to be extremely practical and successful in operation in the protection of lines and equipment from damage and although I have described but one embodiment of the invention, I desire that it be understood that modifications may be made and that no limitations upon the invention are intended other than are imposed by the scope of the appended claims.

What I claim as new and desire to secure by Letters Patent of the United States is as follows:

1. A lightning arrester for transmission lines comprising an insulating spool through which the line passes, a coil on said spool, a collar of magnetic material having radial arms of magnetic material clamped on said coil, a metallic conductor ring supported by said arms, a lead connecting one end of the coil to said collar, and a ground connection extending from said collar.

2. A protective device for power line systems comprising an insulated coil support apertured to receive a line conductor axially therethrough, a winding carried by said support, a magnetic member centrally positioned on said support and extending laterally on opposite sides thereof, the ends of said magnetic member being apertured to receive a looped member encircling said winding.

3. A protective device for power line systems comprising an insulated spool member having an axial bore for the passage of a line conductor therethrough, flanges at each end of said spool member for the retention of an inductance on said member, a magnetic clamp centrally positioned on said spool member and extending in opposite directions on either side of said spool member, and a conductive loop carried at opposite ends of said magnetic clamp, said conductive loop and clamp being connected at one end to said inductance and the other end of said inductance being connected to ground.

4. In a protective apparatus for transmission lines, a plurality of line conductors, a plurality of spool members positioned upon said conductors, inductances carried by said spool members, laterally projecting members, carried by each of said spool members, a conductive ring positioned in the ends of said laterally projecting members, said inductances being connected in series, said inductances having one end thereof connected in common and the opposite ends thereof connected to said laterally projecting members and to ground.

5. In a protective apparatus for power lines a plurality of line conductors, insulated carriers disposed on said conductors, windings positioned on said carriers, laterally projecting members centrally secured to each of said carriers, each of said members providing a support for a conductive loop in the ends thereof, the end of one of said inductances being connected to the opposite end of an adjacent inductance, the remaining end of said inductances being connected to said laterally projecting members and to ground.

6. A lightning arrester for transmission lines comprising an insulated spool arranged to be concentrically positioned upon a line conductor, insulated flanges at opposite ends of said spool for forming abutments for an inductance wound thereon, a pair of flat members of magnetic material, each of said members having central portions of semi-circular curvature therein, said flat members fitting on opposite sides of said inductance with the semi-circular portions substantially embracing said inductance, a circular conductive hoop member, the outer extremities of said flat members engaging said circular hoop member for supporting said hoop member in spacial relation with respect to said inductance in a plane equidistant from the opposite ends of said inductance and a grounded connection between one end of said inductance and said flat members.

In testimony whereof I affix my signature.

FRANK J. SKONIER.